United States Patent
Van Reed et al.

(10) Patent No.: US 6,419,195 B1
(45) Date of Patent: Jul. 16, 2002

(54) STABILIZING DEVICE

(76) Inventors: Barbara Van Reed, P.O. Box 1344, Douglas, MA (US) 01516; Paul E. Brefka, 196 Cordaville Rd., Southborough, MA (US) 01772

(*) Notice: Subject to any disclaimer, the term of this patent is extended or adjusted under 35 U.S.C. 154(b) by 0 days.

(21) Appl. No.: 09/872,801

(22) Filed: Jun. 4, 2001

(51) Int. Cl.[7] .................................................. A47G 7/02
(52) U.S. Cl. .................... 248/154; 248/312.1; 248/313; 248/500; 47/39
(58) Field of Search ........................... 248/500, 346.03, 248/346.06, 503, 229.12, 229.14, 229.24, 230.1, 230.3, 230.5, 312.1, 313, 316.4, 316.6, 154, 907; 224/42.4; 180/68.5; 47/66.6, 39

(56) References Cited

U.S. PATENT DOCUMENTS

| | | | |
|---|---|---|---|
| 600,506 A | * 3/1898 | Blake et al. ................ 180/68.5 |
| 781,713 A | * 2/1905 | Cahill ......................... 248/154 |
| 1,172,347 A | * 2/1916 | Ford ....................... 16/DIG. 15 |
| 2,513,461 A | * 7/1950 | Duncan, Jr. ..................... 47/39 |
| 3,125,177 A | * 3/1964 | Paller ......................... 180/68.5 |
| 3,414,311 A | * 12/1968 | Trimboli ..................... 248/210 |
| 4,632,201 A | * 12/1986 | Kay ........................... 180/68.5 |
| 5,320,319 A | * 6/1994 | Winger et al. ........... 248/312.1 |
| 5,480,068 A | * 1/1996 | Frazier et al. .......... 222/153.03 |
| 5,601,271 A | * 2/1997 | Janowski et al. ............ 248/503 |
| 5,836,105 A | * 11/1998 | Loosen ........................ 248/154 |

* cited by examiner

Primary Examiner—Leslie A. Braun
Assistant Examiner—Jon Szumny
(74) Attorney, Agent, or Firm—William Nitkin

(57) ABSTRACT

An array of stabilizing devices for disposition under an object, each device having a base and a central upright, hollow, frusto-conical structure with a retention arm adjustably positioned within the top thereof. The object to be retained is positioned on portions of the bases of the devices, and the retention arm of each device is positioned over a portion of the object, such array to aid in retaining the object in an upright position.

9 Claims, 4 Drawing Sheets

STABILIZING DEVICE

BACKGROUND OF THE INVENTION

1. Field of the Invention

The device of this invention is a stabilizing device and more particularly relates to a device for holding objects in an upright position and to prevent their sliding during transport.

2. History of the Prior Art

Barrier devices, such as taught in U.S. Pat. No. 5,601,271 to Janowski et al, are known in the prior art. Barrier devices consist of elongated walls positioned adjacent to objects which they are to stabilize, which objects rest on a flange extending from the bottom of the wall so as to fix the wall in position by the objects' weight to prevent the object from moving during transport, such as in a motor vehicle and the like. It is difficult, though, to position multiple elongated wall barriers around small objects as the size of the barriers causes the barriers to contact one another before they can make effective contact with a small object.

SUMMARY OF THE INVENTION

It is an object of this invention to provide an improved support device which in a preferred embodiment is utilized in a multiple array of three such devices which array is especially useful for retaining generally cylindrical objects, such as potted plants, in an upright position during transport, such as in motor vehicles, to prevent their tipping over or sliding around while the vehicle is being driven. It should be understood that while a potted plant is utilized as an example of a retained object, other objects can be held upright by the device of this invention utilized singly or in groups of two or three. The device of this invention can be provided in an interengaged stack of three, which devices can be disengaged from one another as described below and rearranged in a support array such that the base of each device is positioned under the bottom of the potted plant to be held upright with portions of each device extending over the upper lip of the potted plant so as to retain the potted plant securely in an upright position to prevent its tipping over or sliding during transport.

Each device of the support array has a frusto-conical upright structure extending upwards centrally from a circular flat base. The devices are arranged such that the bases of each device are adjacent to one another in an array wherein a potted plant can be positioned over a portion of each of the bases. Each frusto-conical upright structure has a retention arm which is adjustably positioned vertically within the top of its respective device which retention arm can be locked in position at a desired height adjacent to, and passing over the upper lip of the potted plant so as to hold the pot stationary in relation to the support array. Further, the support array provides an extremely wide base, being the area covered by the combination of all the bases of the devices utilized to prevent tipping of the potted plant resting on such bases. Also, the providing of foam padding under each base causes the bases to frictionally adhere to the vehicle's floor to prevent lateral sliding of the potted plant.

DESCRIPTION OF THE PREFERRED EMBODIMENT(S)

Figure 1:
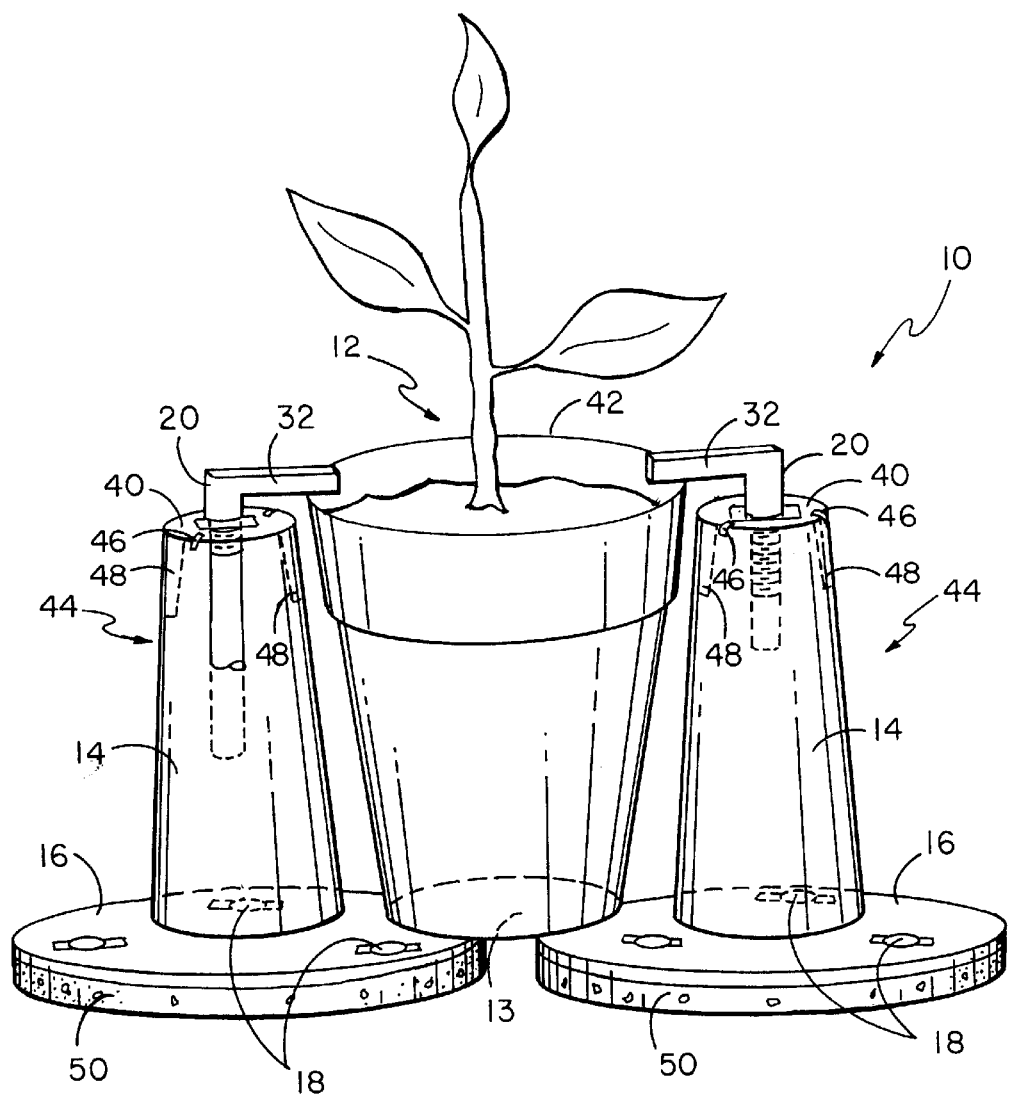
FIG. 1 illustrates a perspective view of two devices of this invention stabilizing a potted plant.
Figure 2:
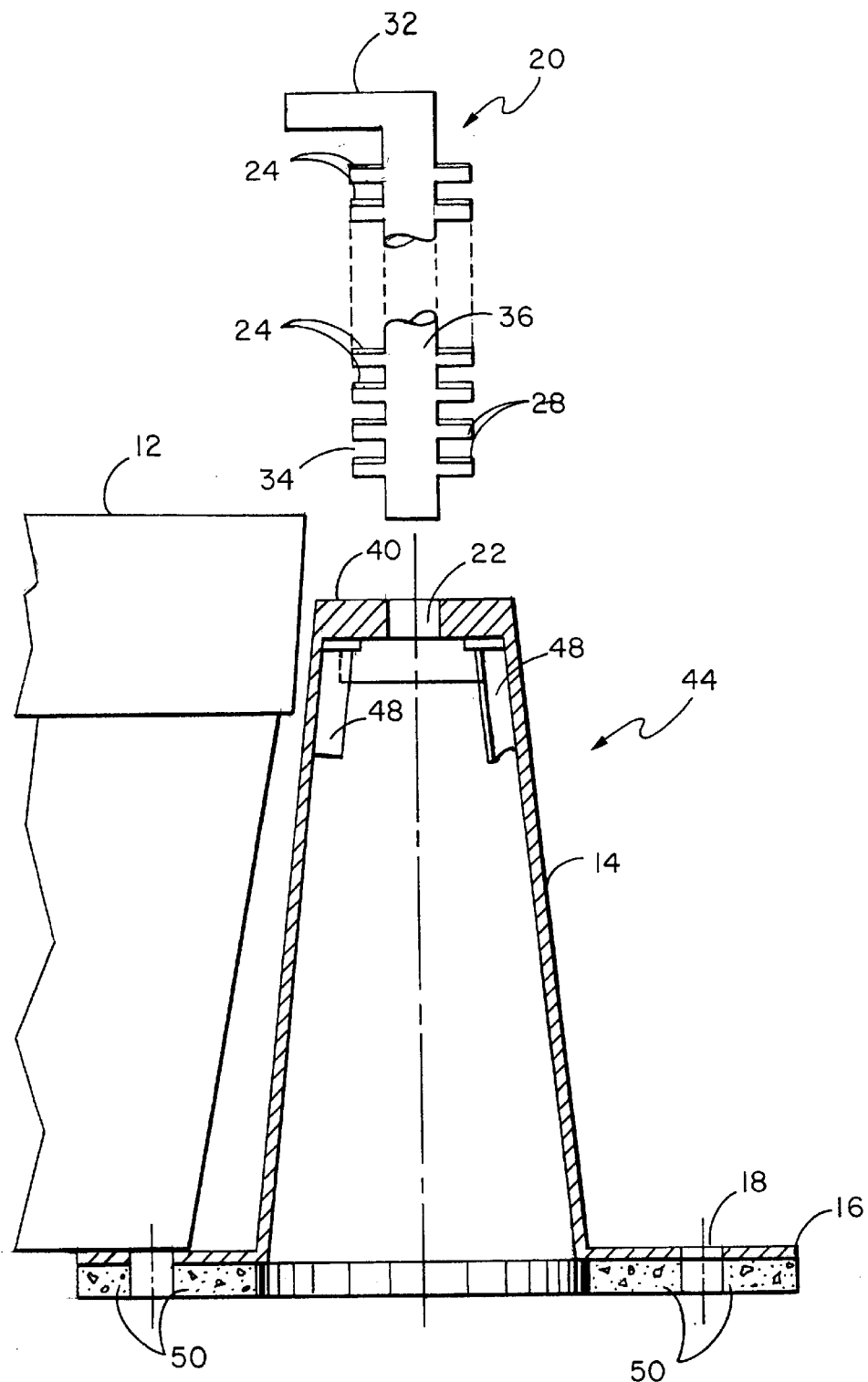
FIG. 2 illustrate a side elevational cutaway view of the device of this invention with its retention arm positioned thereabove and not engaged in position for use.
Figure 4:
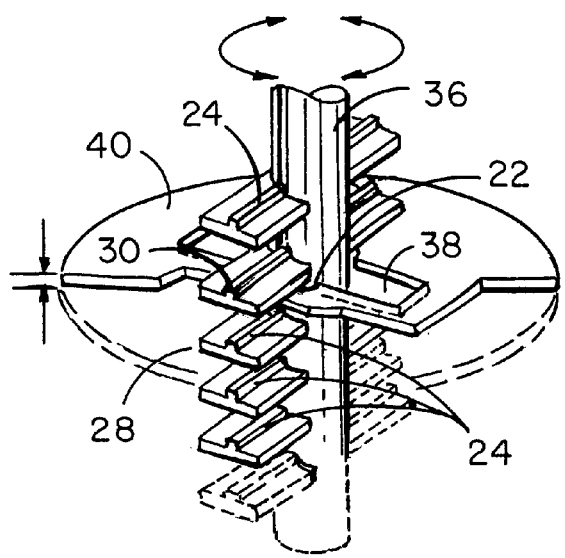
FIG. 4 illustrates a perspective view of a portion of a retention arm being engaged into the top of the device.
Figure 5:
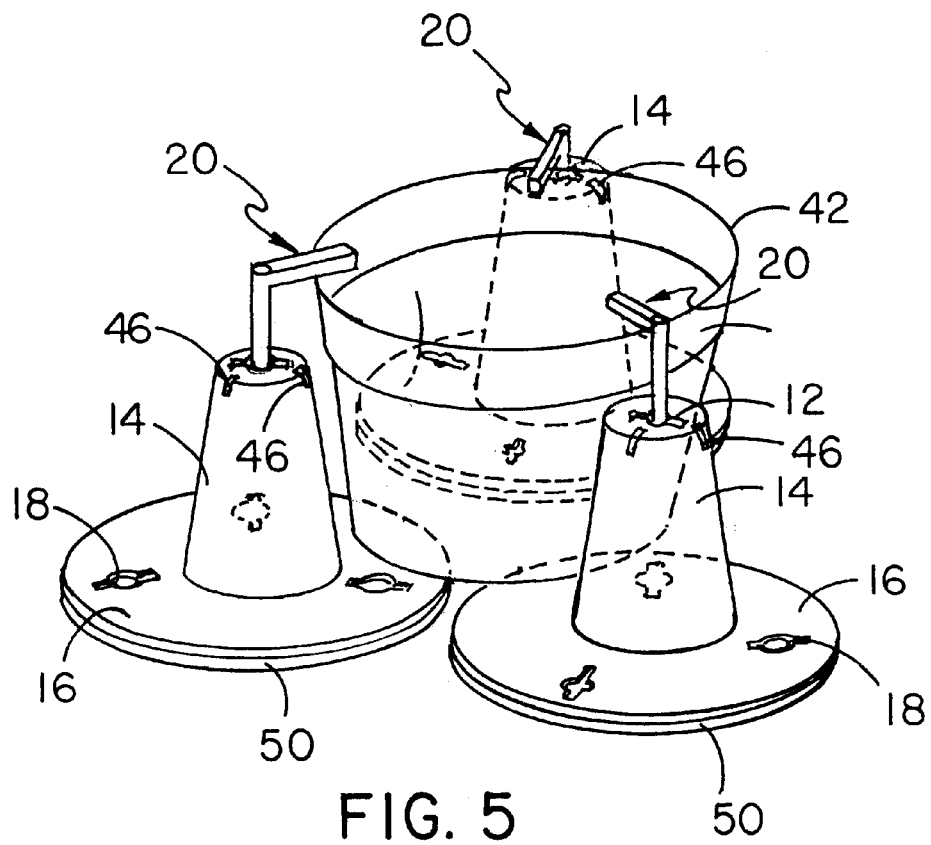
FIG. 5 illustrates a perspective view of a support array of three devices of this invention being engaged to stabilize a potted plant in an upright position.
Figure 6:
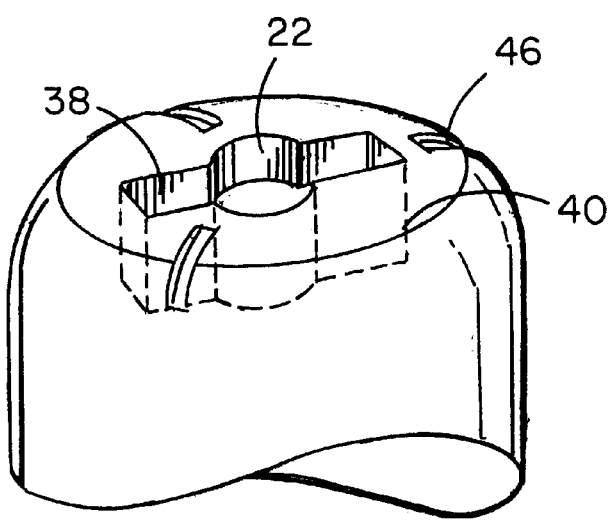
FIG. 6 illustrates a perspective enlarged view of the top of a device to show clearly its alignment projection receipt slots.

FIG. 1 illustrates a potted plant 12 being stabilized by two devices of this invention, forming a support array 10. Although two devices 44 are seen in this view, in other embodiments three of such devices can be arrayed around potted plant 12, such as seen in FIG. 5. Each device 44 consists of a hollow frusto-conical structure 14 which extends upwards from the central portion of base 16. Under base 16 is disposed foam pad 50. The top 40 of frusto-conical structure 14 has an arm aperture 22 defined in the center thereof; and the arm aperture 22, as best seen in FIG. 4, has at least one key receipt slot 38 defined adjacent thereto. Also defined in top 40, as best seen in FIG. 6, are,receipt notches 46. Retention arm 20 includes arm projection 32 and downwardly extending shaft member 36 on which are positioned a plurality of key members 28, as seen in FIG. 2. Between each of the key members is defined a projection receipt area 34. Shaft member 36 has a slightly smaller diameter than that of arm aperture 22 so that it can pass therein, and key members 28 are each of a shape to fit within key receipt slot 38 defined in top 40 whether the slot extends on one or on both sides of arm aperture 22. To position arm projection 32 to a desired height, shaft member 36 and its attached key members are maneuvered upward or downward in arm aperture 22. The key members pass through key receipt slot 38, and the arm projection is then rotated to a desired height, causing key members 28 at that height to be disposed with one key member above top 40 and the next lower adjacent key member to be disposed immediately below top 40. A compression member 24 disposed on the top of each key 28 is compressed when rotated under top 40 and helps to securely hold the retention arm in place when retention arm 20 is rotated at the desired height. The desired height of retention arm 20 to hold potted plant 12 in place would be at the height of upper lip 42 of potted plant 12, as seen in FIG. 1, where each retention arm 20 has had its arm projection 32 rotated over to contact upper lip 42 of potted plant 12 such that the potted plant is retained securely on top of portions of the respective bases 16 of each device 44 and between the devices so that the potted plant will not tip over. The combined area of the bases 16 of the devices is substantially greater than the area of the bottom 13 of the potted plant alone and therefore the support array of this invention provides significant stability to the potted plant. Foam padding 50 disposed on the bottom of the base of each device helps prevent lateral sliding of the potted plant due to the foam's frictional adherence to the surface on which it makes contact.

Figure 3:
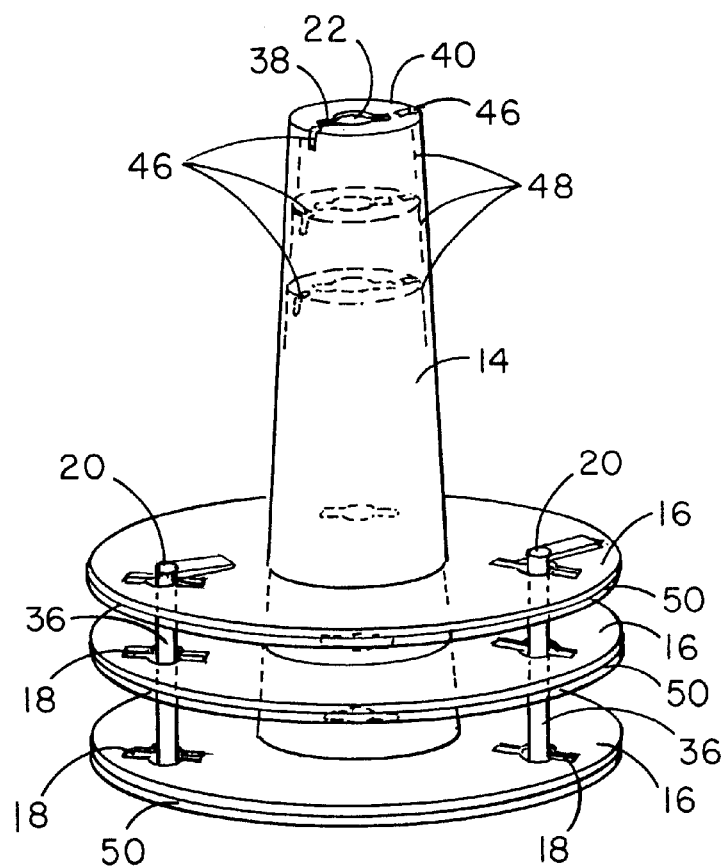
FIG. 3 illustrates a perspective view of three of the devices interlocked together in storage mode.

When not in use, the devices of this invention can be stacked one upon the other, as seen in FIG. 3 where three devices are shown stacked in storage mode. Such stacking is possible because the hollow frusto-conical structure 14 of each device is narrower at its top than at its base. Retention arms 20 can be inserted into base apertures 18 with key slots defined therein, similar to arm aperture 22, such base apertures 18 being aligned as one rotates each device in relationship to one another to receive the retention arms through a plurality of such devices, such as illustrated in FIG. 3, where three devices are interlocked with the retention arms from each of the devices passing through the respective base apertures 18 to lock three of the devices together for easy storage thereof. The retention arms can be locked into the bases by similar structure to that which retains a retention arm in the top of the device. To aid in aligning the base apertures 18, one or more alignment projections 48 can be provided inside the top of each device for engagement into a receipt notch 46 of the next lower device when base apertures 18 are in proper alignment. This alignment feature makes it easy to align the base apertures when stacking three devices.

It should be noted that it is an important feature of the device of this invention when the devices are utilized in a support array for frusto-conical upright structure 14 to be rounded in shape so that it can come against the sides of the potted plant and not interfere with one another as the bases of the three devices are pushed together toward one another under the bottom of the potted plant to form a combined wide base to help hold such potted plant in an upright position.

Although the present invention has been described with reference to particular embodiments, it will be apparent to those skilled in the art that variations and modifications can be substituted therefor without departing from the principles and spirit of the invention.

We claim:

1. A device for holding an object in an upright position, said object having a top, bottom, side and a height, said device comprising:

a base having a central portion and a bottom, said base receiving a portion of the bottom of said object thereon;

a hollow frusto-conical structure having a top, said frusto-conical structure extending upright a distance from said central portion of said base, said frusto-conical structure for positioning against said side of said object;

a top aperture defined in said top of said frusto-conical structure; and a retention arm comprised of an arm projection attached to a vertically disposed shaft, said retention arm adjustably positionable in said top aperture and lockable at various heights in relation to the object to be retained in an upright position, at least one of said heights being immediately above said height of said top of said object.

2. The device of claim 1 wherein said top of said frusto-conical structure has a key receipt slot defined therein adjacent to said top aperture and said retention arm has a plurality of spaced-apart key members disposed along said shaft, said space defined between each key member forming a receipt area such that when said retention arm is passed into said arm aperture, said key members pass through said key receipt slots; and at a desired height said retention arm can be rotated so that said key members pass over a portion of said top of said frusto-conical structure and under said portion of said top of said frusto-conical structure to lock said retention arm in position at a desired height.

3. The device of claim 1 further including at least two of said devices arranged in conjunction with one another around said object with a portion of the bottom of said object resting on a portion of the base of each of said devices.

4. The device of claim 3 wherein the base of each device has at least one base aperture defined therein such that when said devices are stacked, said retention arms can be disposed into said base apertures for interlocking said devices together.

5. The device of claim 4 wherein said top of said frusto-conical structure has a key receipt slot defined therein adjacent to said top aperture and said retention arm has a plurality of spaced-apart key members disposed along said shaft, said space defined between each key member forming a projection receipt area such that when said retention arm is passed into said arm aperture, said key members pass through said key receipt slots; and at a desired height said retention arm can be rotated so that said key members pass over a portion of said top of said frusto-conical structure and under said portion of said top of said frusto-conical structure to lock said retention arm in position at a desired height.

6. The device of claim 5 further including a key receipt slot defined in said base adjacent to said base aperture, said key receipt slot for receiving and locking said retention member therein.

7. The device of claim 6 wherein in a storage mode three of said devices are stacked one upon the other with said hollow frusto-conical structure of one device passing up into said hollow frusto-conical structures of the other devices, each base of the devices having three base apertures defined therein, said base apertures alignable with the corresponding base apertures of the other devices, each aligned group of base apertures for receiving one of said retention arms of said devices therein for locking said stack together.

8. The device of claim 7 further including means for alignment of each of said three base apertures of said devices for receipt in each of one of said three retention arms of said devices.

9. The device. of claim 5 further including foam padding disposed under the bottom of said base of said device.

* * * * *